(12) United States Patent
Chen et al.

(10) Patent No.: US 11,293,759 B2
(45) Date of Patent: Apr. 5, 2022

(54) METHOD FOR DECOUPLING ANGULAR VELOCITY IN TRANSFER ALIGNMENT PROCESS UNDER DYNAMIC DEFORMATION

(71) Applicant: SOUTHEAST UNIVERSITY, Nanjing (CN)

(72) Inventors: Xiyuan Chen, Nanjing (CN); Ping Yang, Nanjing (CN); Junwei Wang, Nanjing (CN); Lin Fang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 16/980,860

(22) PCT Filed: Mar. 12, 2019

(86) PCT No.: PCT/CN2019/077890
§ 371 (c)(1),
(2) Date: Sep. 15, 2020

(87) PCT Pub. No.: WO2020/062792
PCT Pub. Date: Apr. 2, 2020

(65) Prior Publication Data
US 2021/0010812 A1    Jan. 14, 2021

(30) Foreign Application Priority Data
Sep. 27, 2018  (CN) .......................... 201811136759.7

(51) Int. Cl.
*G01C 21/18* (2006.01)
*G01C 25/00* (2006.01)
*G01C 21/16* (2006.01)

(52) U.S. Cl.
CPC ........... *G01C 21/183* (2020.08); *G01C 21/18* (2013.01); *G01C 25/005* (2013.01)

(58) Field of Classification Search
CPC .... G01C 25/005; G01C 21/16; G01C 21/005; G01C 21/183
See application file for complete search history.

(56) References Cited

U.S. PATENT DOCUMENTS

| 5,948,045 A | 9/1999 | Reiner |
| 2006/0015248 A1* | 1/2006 | Huddle .................. G01C 21/16 701/505 |

(Continued)

FOREIGN PATENT DOCUMENTS

| CN | 103175545 A | 6/2013 |
| CN | 103913181 A | 7/2014 |

(Continued)

OTHER PUBLICATIONS

Xiao Yanxia et al., Study on Transfer Alignment with the Wing Flexure of Aircraft, Aerospace Control, 2001, pp. 27-35, No. 2.

(Continued)

*Primary Examiner* — Ryan Rink
(74) *Attorney, Agent, or Firm* — Bayramoglu Law Offices LLC

(57) ABSTRACT

A method for decoupling an angular velocity in a transfer alignment process under a dynamic deformation includes: (1) generating, by a trajectory generator, information about an attitude, a velocity, and a position of a main inertial navigation system and an output of an inertial device, and simulating a bending deformation angle $\vec{\theta}$ between the main inertial navigation system and a slave inertial navigation system and a bending deformation angular velocity $\vec{\omega}_\theta$ by using second-order Markov; (2) decomposing the dynamic deformation into a vibration deformation and a bending deformation, and establishing an angular velocity model under the dynamic deformation of a wing; (3) deducing an error angle $\Delta \vec{\phi}$ between the main inertial navigation (Continued)

system and the slave inertial navigation system; and (4) deducing an expression $\Delta\vec{\omega}$ of a coupling error angular velocity, and applying that to an angular velocity matching process of transfer alignment to improve the precision of the transfer alignment.

4 Claims, 2 Drawing Sheets

(56) References Cited

U.S. PATENT DOCUMENTS

| | | | | |
|---|---|---|---|---|
| 2006/0224321 | A1* | 10/2006 | Lund | G01C 23/005 |
| | | | | 701/470 |
| 2009/0030608 | A1* | 1/2009 | Soehren | G01C 21/165 |
| | | | | 701/510 |

FOREIGN PATENT DOCUMENTS

| | | |
|---|---|---|
| CN | 108387227 A | 8/2018 |
| CN | 109141476 A | 1/2019 |

OTHER PUBLICATIONS

Ping Yang et al., Decoupling of Airborne Dynamic Bending Deformation Angle and Its Application in the High-Accuracy Transfer Alignment Process, Sensors, 2019, pp. 1-14, 19, 214.

* cited by examiner

METHOD FOR DECOUPLING ANGULAR VELOCITY IN TRANSFER ALIGNMENT PROCESS UNDER DYNAMIC DEFORMATION

CROSS REFERENCE TO THE RELATED APPLICATIONS

This application is the national phase entry of International Application No. PCT/CN2019/077890, filed on Mar. 12, 2019, which is based upon and claims priority to Chinese Patent Application No. 201811136759.7, filed on Sep. 27, 2018, the entire contents of which are incorporated herein by reference.

TECHNICAL FIELD

The present invention relates to a method for decoupling an angular velocity in a transfer alignment process under a dynamic deformation, and belongs to the field of inertial navigation technologies.

BACKGROUND

The bearing capacity of aircrafts is limited, especially that of wing parts. Therefore, dynamic deformation measurement of aircraft wings poses very strict requirements on the weight and size of a measuring device. The measurement precision of an inertial measurement unit (IMU) unit is directly proportional to the weight and size, and an IMU with high precision cannot be mounted at each bearing position.

Currently, to perform deformation measurement of aircraft wings, a position and orientation system (POS) with high precision is mounted on the fuselage, while an IMU unit with low precision is used on wing parts. Information about a high-precision position and an attitude of each positioning point is obtained through transfer alignment between a main inertial navigation system and a slave inertial navigation system. However, the additional velocity, angular velocity and angle generated by the deflection deformation between the main and slave systems are main factors affecting the precision thereof. In the existing measurement of dynamic deformation of aircraft wings, wings are regarded as a rigid body without considering the deflection deformation, and the precision of the transfer alignment can hardly reach the required precision.

SUMMARY

The objective of the present invention is to provide a method for decoupling an angular velocity in a transfer alignment process under a dynamic deformation, including geometrically modeling and mathematically analyzing an error angle and angular velocity caused by coupling between a fuselage movement and a dynamic deformation in the transfer alignment process of dynamic deformation measurement of aircraft wings, and deducing expressions of the coupling angle and angular velocity, for improving the precision of the transfer alignment in an angular velocity matching process of the transfer alignment.

The foregoing objective is achieved through the following technical solutions:

A method for decoupling an angular velocity in a transfer alignment process under a dynamic deformation, where the method includes steps of:

(1) generating, by a trajectory generator, information about an attitude, a velocity, and a position of a main inertial navigation system and an output of an inertial device, and simulating a bending deformation angle $\vec{\theta}$ between the main inertial navigation system and a slave inertial navigation system and a bending deformation angular velocity $\vec{\omega}_\theta$ by using second-order Markov;

(2) decomposing the dynamic deformation into a vibration deformation with high frequency and low amplitude, and a bending deformation with low frequency and high amplitude, and establishing an angular velocity model under the dynamic deformation of a wing;

(3) considering the vibration deformation with high frequency and low amplitude in step (2) as a noise, geometrically analyzing the bending deformation with low frequency and high amplitude, and deducing an error angle $\Delta \vec{\phi}$ between the main inertial navigation system and the slave inertial navigation system caused by the dynamic deformation between the main inertial navigation system and the slave inertial navigation system; and (4) substituting the error angle $\Delta \vec{\phi}$ deduced in step (3) into an expression $\Delta \vec{\omega}$ of a coupling error angular velocity and applying that to an angular velocity matching process of transfer alignment, to improve the precision of the transfer alignment.

Further, the decomposing the dynamic deformation into a vibration deformation with high frequency and low amplitude, and a bending deformation with low frequency and high amplitude in step (2) refers to that a dynamic elastic deformation includes two parts: bending and vibration, where the bending is a movement with low frequency and high amplitude, and the vibration represents a movement with high frequency and low amplitude; and the establishing an angular velocity model under the dynamic deformation of a wing in step (2) is specifically: the angular velocity of the main inertial navigation system and the slave inertial navigation system being expressed as:

$$\vec{\omega} = \vec{\omega}_{stat} + \vec{\omega}_{dyn}$$

where $$\vec{\omega}_{dyn} = \vec{\omega}_{dyn}^{flex} + \vec{\omega}_{dyn}^{vib}$$

in the formula, $\vec{\omega}$ represents a relative angular velocity vector between the main inertial navigation system and the slave inertial navigation system, $\vec{\omega}_{stat}$ represents a static relative angular velocity vector between the main inertial navigation system and the slave inertial navigation system, $\vec{\omega}_{dyn}$ represents a dynamic relative angular velocity vector between the main inertial navigation system and the slave inertial navigation system, $\vec{\omega}_{dyn}^{flex}$ represents an angular velocity changed part generated by the bending deformation in the dynamic relative angular velocity vector between the main inertial navigation system and the slave inertial navigation system, and $\vec{\omega}_{dyn}^{vib}$ represents an angular velocity changed part generated by the vibration deformation in the dynamic relative angular velocity vector between the main inertial navigation system and the slave inertial navigation system.

Further, a specific method of the deducing an error angle $\Delta\vec{\phi}$ between the main inertial navigation system and the slave inertial navigation system caused by the dynamic deformation between the main inertial navigation system and the slave inertial navigation system in step (3) is: geometrically analyzing a coupling angle vector of the dynamic deformation, where in the dynamic angular velocity vector, an angular velocity change $\vec{\omega}_{dyn}^{vib}$ generated by the vibration deformation is regarded as a noise, and let an angular velocity change $\vec{\omega}_{dyn}^{flex}$ generated by the bending deformation, $$\vec{\omega}_{dyn}^{flex} = \vec{\omega}_\theta$$

then:

$$\vec{\omega}_{is}^{s'} = C_m^{s'}(\vec{\varphi})\vec{\omega}_{im}^m$$

$$\vec{\varphi} = \vec{\phi}_0 + \vec{\theta}$$

where $\vec{\omega}_{is}^{s'}$ represents an output of a gyroscope of the slave system in an ideal state, $\vec{\omega}_{im}^m$ represents an output of a gyroscope of the main system, $C_m^{s'}(\vec{\varphi})$ represents a transformation matrix between the main inertial navigation system and the slave inertial navigation system, $\vec{\varphi}$ represents an error angle vector between the main inertial navigation system and the slave inertial navigation system, $\vec{\phi}_0$ represents an error angle vector of initial mounting between the main inertial navigation system and the slave inertial navigation system, and an additional angular velocity $\vec{\omega}_\theta$ is generated due to a dynamic bending deformation, and the angular velocity output $\vec{\omega}_{is}^s$ of the slave system in an actual state is expressed as:

$$\vec{\omega}_{is}^s = \vec{\omega}_{is}^{s'} + \vec{\omega}_\theta$$

let the error angle vector between the main inertial navigation system and the slave inertial navigation system caused by the coupling angular velocity of the bending deformation $\Delta\vec{\phi}$, and let $$\Delta\vec{\phi} = [\Delta\phi_x, \Delta\phi_y, \Delta\phi_z]^T$$

subscripts x, y, z respectively represent three directions: east, north, and up, $\Delta\vec{\phi}$ is the error angle vector between the main inertial navigation system and the slave inertial navigation system caused by the coupling angular velocity of the bending deformation, that is, an angle between $\vec{\omega}_{is}^s$ and $\vec{\omega}_{is}^{s'}$, let $\vec{\omega}_{is}^{s'} = [\omega_{isx}^{s'}, \omega_{isy}^{s'}, \omega_{isz}^{s'}]^T$, and $\vec{\omega}_\theta = [\omega_{\theta x}, \omega_{\theta y}, \omega_{\theta z}]^T$, then:

$$\vec{\omega}_{is}^s = [\omega_{isx}^{s'} + \omega_{\theta x}, \omega_{isy}^{s'} + \omega_{\theta y}, \omega_{isz}^{s'} + \omega_{\theta z}]^T$$

according to a geometric relationship:

$$\begin{cases} \Delta\phi_x = \arctan\dfrac{\omega_{isz}^{s'} + \omega_{\theta z}}{\omega_{isy}^{s'} + \omega_{\theta y}} - \arctan\dfrac{\omega_{isz}^{s'}}{\omega_{isy}^{s'}} \\ \Delta\phi_y = \arctan\dfrac{\omega_{isx}^{s'} + \omega_{\theta x}}{\omega_{isz}^{s'} + \omega_{\theta z}} - \arctan\dfrac{\omega_{isx}^{s'}}{\omega_{isz}^{s'}} \\ \Delta\phi_z = \arctan\dfrac{\omega_{isy}^{s'} + \omega_{\theta y}}{\omega_{isx}^{s'} + \omega_{\theta x}} - \arctan\dfrac{\omega_{isy}^{s'}}{\omega_{isx}^{s'}} \end{cases}$$

an arctan function is expanded by using Taylor series, and high-order terms are omitted, to obtain:

$$\begin{cases} \Delta\phi_x = \dfrac{\omega_{isz}^{s'} + \omega_{\theta z}}{\omega_{isy}^{s'} + \omega_{\theta y}} - \dfrac{\omega_{isz}^{s'}}{\omega_{isy}^{s'}} \\ \Delta\phi_y = \dfrac{\omega_{isx}^{s'} + \omega_{\theta x}}{\omega_{isz}^{s'} + \omega_{\theta z}} - \dfrac{\omega_{isx}^{s'}}{\omega_{isz}^{s'}} \\ \Delta\phi_z = \dfrac{\omega_{isy}^{s'} + \omega_{\theta y}}{\omega_{isx}^{s'} + \omega_{\theta x}} - \dfrac{\omega_{isy}^{s'}}{\omega_{isx}^{s'}} \end{cases}$$

Further, the substituting the error angle $\Delta\vec{\phi}$ deduced in step (3) into an expression $\Delta\vec{\omega}$ of a coupling error angular velocity in step (4) is specifically: an angular velocity difference $\Delta\vec{\omega}$ between the main inertial navigation system and the slave inertial navigation system being expressed as:

$$\Delta\vec{\omega} = \vec{\omega}_{is}^s - \vec{\omega}_{im}^m$$

$$\Delta\vec{\omega} = \vec{\omega}_{is}^{s'} + \vec{\omega}_\theta - \vec{\omega}_{im}^m$$

the error angle vector between the main inertial navigation system and the slave inertial navigation system is $\Delta\vec{\phi}$, then the transformation matrix between the main inertial navigation system and the slave inertial navigation system is expressed as $C_m^{s'}(\vec{\varphi} + \Delta\vec{\phi})$, and the error angular velocity between the main inertial navigation system and the slave inertial navigation system is expressed as:

$$\Delta\vec{\omega} = C_m^{s'}(\vec{\varphi} + \Delta\vec{\phi})\vec{\omega}_{im}^m + \vec{\omega}'_\theta - \vec{\omega}_{im}^m$$

where $\vec{\omega}'_\theta$ is a projection of $\vec{\omega}_\theta$ on $\vec{\omega}_{is}^s$, and because an equivalent rotation vector $(\vec{\varphi} + \Delta\vec{\phi})$ between the main system and the slave system is small, then $$[(\vec{\varphi} + \Delta\vec{\phi})\times] = I - C_m^{s'}(\vec{\varphi} + \Delta\vec{\phi})$$

where × represents an antisymmetric matrix, therefore:

$$\Delta\vec{\omega} = \vec{\omega}'_\theta - [(\vec{\varphi} + \Delta\vec{\phi})\times]\vec{\omega}_{im}^m$$

where $[(\vec{\varphi} + \Delta\vec{\phi})\times]$ represents an antisymmetric matrix, and $\vec{\omega}'_\theta$ is expressed as:

$$\vec{\omega}'_\theta = A(\vec{\omega}_\theta)T(\vec{\alpha})\vec{u}_{is}^s$$

where $A(\vec{\omega}_\theta)$ represents an amplitude matrix, $\vec{u}_{is}^s$ represents an identity matrix in a direction $\vec{\omega}_{is}^s$, $\vec{\alpha}$ represents an angle vector between $\vec{\omega}_\theta$ and $\vec{\omega}_{is}^s$, $T(\vec{\alpha})$ represents a transformation matrix from $\vec{\omega}_\theta$ to $\vec{\omega}_{is}^s$, $\vec{\alpha} = \pi/2U - \Delta\vec{\phi}$, where $U=[1\ 1\ 1]^T$, and:

$$A(\vec{\omega}_\theta) = \begin{bmatrix} |\omega_{\theta x}| & 0 & 0 \\ 0 & |\omega_{\theta y}| & 0 \\ 0 & 0 & |\omega_{\theta z}| \end{bmatrix} \vec{u}_{is}^s = \frac{\vec{\omega}_{is}^s}{|\vec{\omega}_{is}^s|} T(\vec{\alpha}) = I - \left[\left(\frac{\pi}{2} U - \Delta\vec{\phi}\right)\times\right]$$

a symbol $\|$ represents modulo operation and $\vec{\omega}'_\theta$ is substituted into the expression of $\Delta\vec{\omega}$, then:

$$\Delta\vec{\omega} = A(\vec{\omega}_\theta)T(\vec{\alpha})\vec{u}_{is}^s - [(\vec{\varphi} + \Delta\vec{\phi})\times]\vec{\omega}_{im}^m$$

$T(\vec{\alpha})$ is substituted into the expression of $\Delta\vec{\omega}$, then:

$$\Delta\vec{\omega} = (\vec{\omega}_{im}^m \times)\vec{\varphi} + (\vec{\omega}_{im}^m \times)\Delta\vec{\phi} + A(\vec{\omega}_\theta)\vec{u}_{is}^s - A(\vec{\omega}_\theta)\left[\left(\frac{\pi}{2}U - \Delta\vec{\phi}\right)\times\right]\vec{u}_{is}^s$$

let $\Delta\vec{\omega}_1 = (\vec{\omega}_{im}^m \times)\vec{\varphi} + A(\vec{\omega}_\theta)\vec{u}_{is}^s$ and $$\Delta\vec{\omega}_2 = (\vec{\omega}_{im}^m \times)\Delta\phi - A(\vec{\omega}_\theta)\left[\left(\frac{\pi}{2}U - \Delta\vec{\phi}\right)\times\right]\vec{u}_{is}^s,$$

according to $\Delta\vec{\phi}$, $\Delta\vec{\omega}_2$ is solved, to compensate the error of angular velocity matching in the process of transfer alignment, to improve the precision of the transfer alignment.

Beneficial Effects

Compared with the prior art, the present invention considers the coupling error of a rigid body motion and a dynamic elastic deformation between a main inertial navigation system and a slave inertial navigation system in a carrier motion, and performs spatial geometric modeling and mathematical analysis on the angle error and the angular velocity error between the main inertial navigation system and the slave inertial navigation system under the dynamic elastic deformation, to obtain the coupling angle error between the main inertial navigation system and the slave inertial navigation system under the dynamic deformation, thereby deducing an expression of the angular velocity error between the main inertial navigation system and the slave inertial navigation system under the dynamic deformation. In the conventional transfer alignment process, a dynamic deformation angular velocity is regarded as collinear with an angular velocity of the slave system in an ideal state. Although the dynamic deformation error is compensated to a particular extent, the dynamic deformation angular velocity is not collinear with the angular velocity of the slave system in an actual state, and collineation will introduce errors. The present invention geometrically analyzes the coupling angle between the main inertial navigation system and the slave inertial navigation system, to obtain the expression of the coupling angle, and further mathematically models the coupling angular velocity between the main inertial navigation system and the slave inertial navigation system. The model is applied to an angular velocity matching process of the transfer alignment, so that the precision of the transfer alignment can be improved.

DETAILED DESCRIPTION OF THE EMBODIMENTS

Figure 1:
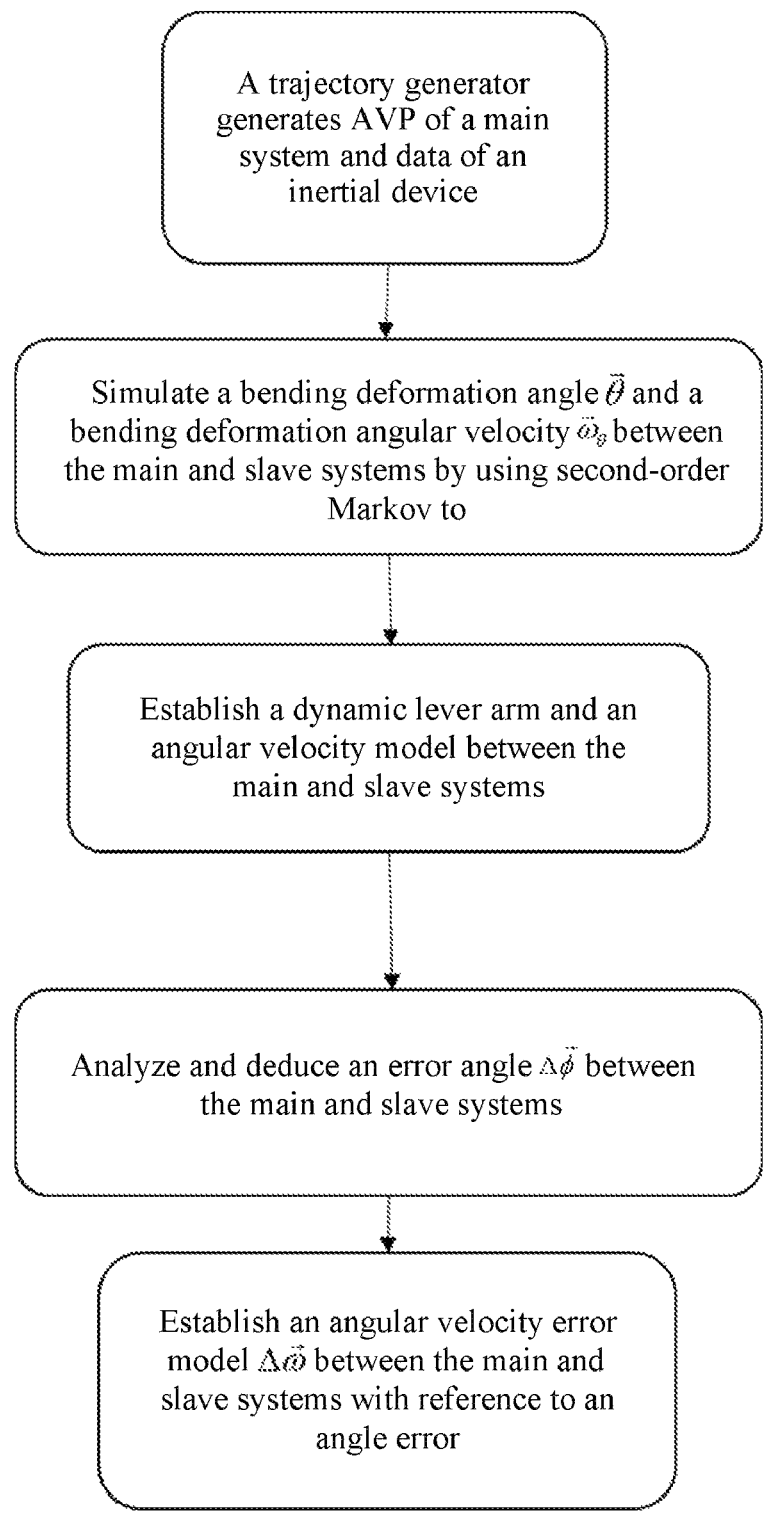
FIG. 1 is a flowchart of decoupling an angular velocity between a main inertial navigation system and a slave inertial navigation system under a dynamic deformation.

The present invention is further described in detail below with reference to the specific implementations and the accompanying drawings:

As shown in FIG. 1, the present invention provides a method for decoupling an angular velocity in a transfer alignment process under a dynamic deformation. The method includes: simulating, by using a trajectory simulator, an attitude, a velocity and a position of a main system of an aircraft and output data of an inertial device of the aircraft, and simulating, by using second-order Markov, a bending deformation angle $\vec{\theta}$ between the main inertial navigation system and a slave inertial navigation system and a bending deformation angular velocity $\vec{\omega}_\theta$; dividing the dynamic deformation into a vibration deformation with high frequency and low amplitude, an a bending deformation with low frequency and high amplitude with reference to the dynamic deformation between the main inertial navigation system and the slave inertial navigation system, and establishing an angular velocity model between the main inertial navigation system and the slave inertial navigation system; regarding the vibration deformation as a noise, analyzing and processing the bending deformation, establishing a geometric model of the coupling angle between the main inertial navigation system and the slave inertial navigation system under the bending deformation, solving to obtain a coupling angle $\Delta\vec{\phi}$ caused by the bending deformation between the main and slave systems; and with reference to the spatial relationship between the angular velocity vectors of the main inertial navigation system and the slave inertial navigation system, deducing the expression of the error angular velocity and applying that to an angular velocity matching process of the transfer alignment to improve the navigation precision of the slave system. The following is a detailed mathematical analysis of the error analysis:

Step 1: A trajectory generator generates information about an attitude, a velocity, and a position of a main inertial navigation system and an output of an inertial device, and simulates a bending deformation angle $\vec{\theta}$ between the main inertial navigation and a slave inertial navigation and a bending deformation angular velocity $\vec{\omega}_\theta$ by using second-order Markov;

Step 2: Decompose the dynamic deformation into a vibration deformation with high frequency and low amplitude, and a bending deformation with low frequency and high amplitude, and establish an angular velocity model and a lever arm under the dynamic deformation of a wing; analyze the additional angular velocity generated by the dynamic deformation of an aircraft wing, where the error-free angular velocity between the main inertial navigation system and the slave inertial navigation system may be expressed as:

$$\vec{\omega} = \vec{\omega}_{stat} + \vec{\omega}_{dyn}$$

$$\vec{\omega}_{dyn} = \vec{\omega}_{dyn}^{flex} + \vec{\omega}_{dyn}^{vib}$$

A dynamic elastic deformation includes two parts: bending and vibration. The bending is a movement with low frequency and high amplitude, and the vibration represents a movement with high frequency and low amplitude. In the formula, $\vec{\omega}$ represents a relative angular velocity vector between the main inertial navigation system and the slave inertial navigation system, $\vec{\omega}_{stat}$ represents a static relative angular velocity vector between the main inertial navigation system and the slave inertial navigation system, $\vec{\omega}_{dyn}$ represents a dynamic relative angular velocity vector between the main inertial navigation system and the slave inertial navigation system, $\vec{\omega}_{dyn}^{flex}$ represents an angular velocity changed part generated by the bending deformation in the dynamic relative angular velocity vector between the main inertial navigation system and the slave inertial navigation system, and $\vec{\omega}_{dyn}^{vib}$ represents an angular velocity changed part generated by the vibration deformation in the dynamic relative angular velocity vector between the main inertial navigation system and the slave inertial navigation system.

Step 3: Geometrically analyze the error angle vector of the dynamic deformation with reference to the angle error between the main inertial navigation system and the slave inertial navigation system, where in the dynamic angular velocity vector, an angular velocity change $\vec{\omega}_{dyn}^{vib}$ generated by the vibration deformation may be regarded as a noise, and let an angular velocity change $\vec{\omega}_{dyn}^{flex}$ generated by the bending deformation $$\vec{\omega}_{dyn}^{flex} = \vec{\omega}_\theta$$

then:

$$\vec{\omega}_{is}^{s'} = C_m^{s'}(\vec{\varphi})\vec{\omega}_{im}^m$$

$$\vec{\varphi} = \vec{\varphi}_0 + \vec{\theta}$$

where $\vec{\omega}_{is}^{s'}$ represents an output of a gyroscope of the slave system in an ideal state, $\vec{\omega}_{im}^m$ represents an output of a gyroscope of the main system, $C_m^{s'}(\vec{\varphi})$ represents a transformation matrix between the main inertial navigation system and the slave inertial navigation system, $\vec{\varphi}$ represents an error angle vector between the main inertial navigation system and the slave inertial navigation system, $\vec{\varphi}_0$ represents an error angle vector of initial mounting between the main inertial navigation system and the slave inertial navigation system, and an additional angular velocity $\vec{\omega}_\theta$ is generated due to a dynamic bending deformation, and the angular velocity output $\vec{\omega}_{is}^s$ of the slave system in an actual state may be expressed as:

$$\vec{\omega}_{is}^s = \vec{\omega}_{is}^{s'} + \vec{\omega}_\theta$$

let the error angle vector between the main inertial navigation system and the slave inertial navigation system caused by the coupling angular velocity of the bending deformation $\Delta\vec{\varphi}$, and let $$\Delta\vec{\varphi} = [\Delta\varphi_x\ \Delta\varphi_y\ \Delta\varphi_z]^T$$

subscripts x,y,z respectively represent three directions: east, north, and up, $\Delta\vec{\varphi}$ is the error angle vector between the main inertial navigation system and the slave inertial navigation system caused by the coupling angular velocity of the bending deformation, that is, an angle between $\vec{\omega}_{is}^s$ and $\vec{\omega}_{is}^{s'}$; let $\vec{\omega}_{is}^{s'} = [\omega_{isx}^{s'}\ \omega_{isy}^{s'}\ \omega_{isz}^{s'}]^T$ and $\vec{\omega}_{is}^{s'} = [\omega_{isx}^{s'}\ \omega_{isy}^{s'}\ \omega_{isz}^{s'}]^T$, then:

$$\vec{\omega}_{is}^s = [\omega_{isx}^{s'} + \omega_{\theta x}\ \omega_{isy}^{s'} + \omega_{\theta y}\ \omega_{isz}^{s'} + \omega_{\theta z}]^T$$

Figure 2:
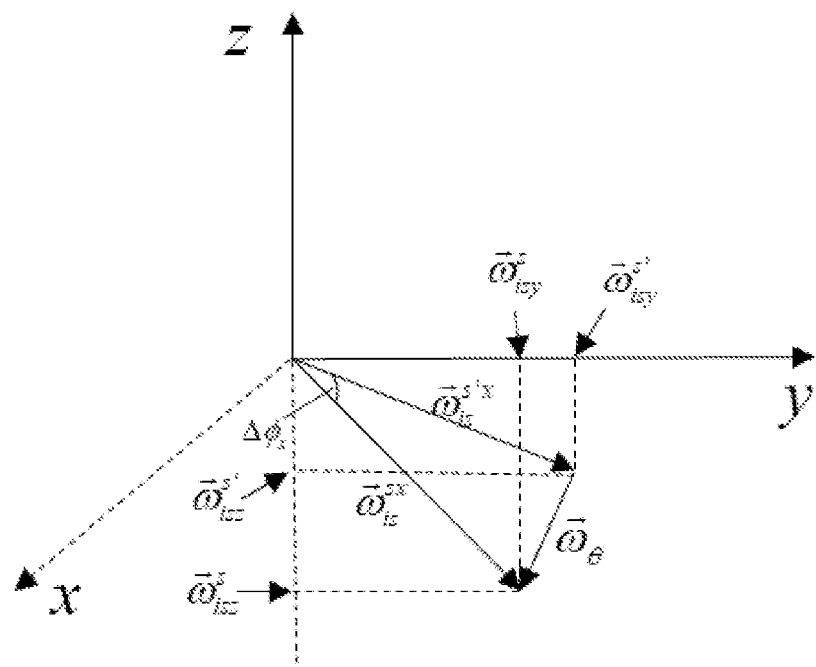
FIG. 2 shows a coupling angle (projected to a plane yoz) between a main inertial navigation system and a slave inertial navigation system under a dynamic deformation.

As shown in FIG. 2, $\vec{\omega}_{is}^{s'x}$ and $\vec{\omega}_{is}^{sx}$ respectively represent the projections of $\vec{\omega}_{is}^{s'}$ and $\vec{\omega}_{is}^s$ on the plane yoz, according to a geometric relationship:

$$\begin{cases} \Delta\phi_x = \arctan\dfrac{\omega_{isz}^{s'} + \omega_{\theta z}}{\omega_{isy}^{s'} + \omega_{\theta y}} - \arctan\dfrac{\omega_{isz}^{s'}}{\omega_{isy}^{s'}} \\ \Delta\phi_y = \arctan\dfrac{\omega_{isx}^{s'} + \omega_{\theta x}}{\omega_{isz}^{s'} + \omega_{\theta z}} - \arctan\dfrac{\omega_{isx}^{s'}}{\omega_{isz}^{s'}} \\ \Delta\phi_z = \arctan\dfrac{\omega_{isy}^{s'} + \omega_{\theta y}}{\omega_{isx}^{s'} + \omega_{\theta x}} - \arctan\dfrac{\omega_{isy}^{s'}}{\omega_{isx}^{s'}} \end{cases}$$

an arctan function is expanded by using Taylor series, and high-order terms are omitted, to obtain:

$$\begin{cases} \Delta\phi_x = \dfrac{\omega_{isz}^{s'} + \omega_{\theta z}}{\omega_{isy}^{s'} + \omega_{\theta y}} - \dfrac{\omega_{isz}^{s'}}{\omega_{isy}^{s'}} \\ \Delta\phi_y = \dfrac{\omega_{isx}^{s'} + \omega_{\theta x}}{\omega_{isz}^{s'} + \omega_{\theta z}} - \dfrac{\omega_{isx}^{s'}}{\omega_{isz}^{s'}} \\ \Delta\phi_z = \dfrac{\omega_{isy}^{s'} + \omega_{\theta y}}{\omega_{isx}^{s'} + \omega_{\theta x}} - \dfrac{\omega_{isy}^{s'}}{\omega_{isx}^{s'}} \end{cases}$$

Figure 3:
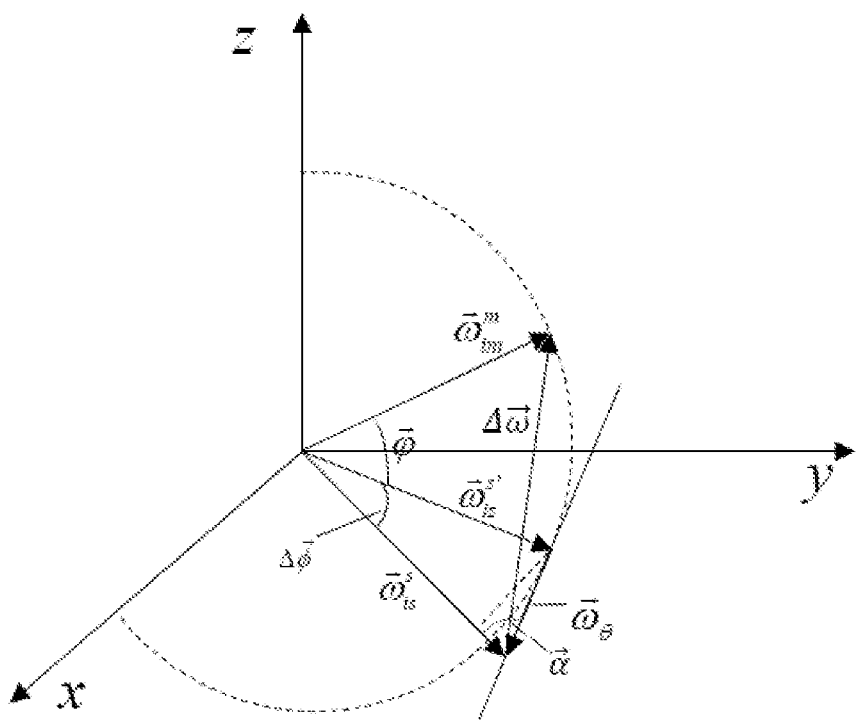
FIG. 3 is a spatial relationship between an angular velocity vector and an additional angular velocity vector with dynamic bending.

Step 4: Geometrically analyze the dynamic angular velocity vector with reference to the spatial relationship between the angular velocity vector and the additional angular velocity vector of dynamic bending; as shown in FIG. 3, the angular velocity difference $\Delta\vec{\omega}$ between the main inertial navigation system and the slave inertial navigation system may be expressed as:

$$\Delta\vec{\omega} = \vec{\omega}_{is}^s - \vec{\omega}_{im}^m$$

$$\Delta\vec{\omega} = \vec{\omega}_{is}^{s'} + \vec{\omega}_\theta - \vec{\omega}_{im}^m$$

The error angle vector between the main inertial navigation system and the slave inertial navigation system is $\Delta\vec{\varphi}$, then the transformation matrix between the main inertial navigation system and the slave inertial navigation system may be expressed as $C_m^{s'}(\vec{\varphi} + \Delta\vec{\varphi})$, and the error angular velocity between the main inertial navigation system and the slave inertial navigation system may be expressed as:

$$\Delta\vec{\omega} = C_m^{s'}(\vec{\varphi} + \Delta\vec{\varphi})\vec{\omega}_{im}^m + \vec{\omega}_\theta' - \vec{\omega}_{im}^m$$

where $\vec{\omega}_\theta'$ is a projection of $\vec{\omega}_\theta$ on $\vec{\omega}_{is}^s$, and because a total error angle $(\vec{\varphi} + \Delta\vec{\varphi})$ between the main inertial navigation system and the slave inertial navigation system is small, then $$[(\vec{\varphi} + \Delta\vec{\varphi}) \times] = I - C_m^{s'}(\vec{\varphi} + \Delta\vec{\varphi})$$

where × represents an antisymmetric matrix, therefore:

$$\Delta\vec{\omega} = \vec{\omega}'_\theta - [(\vec{\varphi}+\Delta\vec{\phi})\times]\vec{\omega}_{im}^m$$

where $[(\vec{\varphi}+\Delta\vec{\phi})\times]$ represents an antisymmetric matrix, and $\vec{\omega}'_\theta$ is expressed as:

$$\vec{\omega}'_\theta = A(\vec{\omega}_\theta)T(\vec{\alpha})\vec{u}_{is}^s$$

where $A(\vec{\omega}_\theta)$ represents an amplitude matrix, $\vec{u}_{is}^s$ represents an identity matrix in a direction $\vec{\omega}_{is}^s$, $\vec{\alpha}$ represents an angle vector between $\vec{\omega}_\theta$ and $\vec{\omega}_{is}^s$, $T(\vec{\alpha})$ represents a transformation matrix from $\vec{\omega}_\theta$ to $\vec{\omega}_{is}^s$, $$\vec{\alpha} = \frac{\pi}{2}U - \Delta\vec{\phi},$$

where $U=[1\ 1\ 1]^T$, and:

$$A(\vec{\omega}_\theta) = \begin{bmatrix} |\omega_{\theta_x}| & 0 & 0 \\ 0 & |\omega_{\theta_y}| & 0 \\ 0 & 0 & |\omega_{\theta_z}| \end{bmatrix}$$

$$\vec{u}_{is}^s = \frac{\vec{\omega}_{is}^s}{|\vec{\omega}_{is}^s|}$$

$$T(\vec{\alpha}) = I - \left[\left(\frac{\pi}{2}U - \Delta\vec{\phi}\right)\times\right]$$

a symbol $\|$ represents modulo operation and $\vec{\omega}'_\theta$ is substituted into the expression of $\Delta\vec{\omega}$, then:

$$\Delta\vec{\omega} = A(\vec{\omega}_\theta)T(\vec{\alpha})\vec{u}_{is}^s - [(\vec{\varphi}+\Delta\vec{\phi})\times]\vec{\omega}_{im}^m$$

$T(\vec{\alpha})$ is substituted into the expression of $\Delta\vec{\omega}$, then:

$$\Delta\vec{\omega} = (\vec{\omega}_{im}^m \times)\vec{\varphi} + (\vec{\omega}_{im}^m \times)\Delta\vec{\phi} + A(\vec{\omega}_\theta)\vec{u}_{is}^s - A(\vec{\omega}_\theta)\left[\left(\frac{\pi}{2}U - \Delta\vec{\phi}\right)\times\right]\vec{u}_{is}^s$$

let $\Delta\vec{\omega}_1 = (\vec{\omega}_{im}^m \times)\vec{\varphi} + A(\vec{\omega}_\theta)\vec{u}_{is}^s$, and $$\Delta\vec{\omega}_2 = (\vec{\omega}_{im}^m \times)\Delta\vec{\phi} - A(\vec{\omega}_\theta)\left[\left(\frac{\pi}{2}U - \Delta\vec{\phi}\right)\times\right]\vec{u}_{is}^s,$$

and according to $\Delta\vec{\phi}$, $\Delta\vec{\omega}_2$ may be solved, to compensate the error of angular velocity matching in the process of transfer alignment, to improve the precision of the transfer alignment.

What is claimed is:

1. A method decoupling an angular velocity in a transfer alignment process under a dynamic deformation of an aircraft wing, comprising:

step (1): generating, by a trajectory generator, information about an attitude, a velocity, and a position of a main inertial navigation system of an aircraft and an output of an inertial device of the aircraft, and simulating a bending deformation angle $\vec{\theta}$ between the main inertial navigation system and a slave inertial navigation system and a bending deformation angular velocity $\vec{\omega}_\theta$ by using second-order Markov;

step (2): decomposing the dynamic deformation into a vibration deformation with a high frequency and a low amplitude, and a bending deformation with a low frequency and a high amplitude, and establishing an angular velocity model under the dynamic deformation of the aircraft wing;

step (3): considering the vibration deformation with the high frequency and the low amplitude in step (2) as a noise, geometrically analyzing the bending deformation with the low frequency and the high amplitude, and deducing an error angle $\Delta\vec{\phi}$ between the main inertial navigation system and the slave inertial navigation system caused by the dynamic deformation of the aircraft wing between the main inertial navigation system and the slave inertial navigation system, wherein the error angle $\Delta\vec{\phi}$ is caused by the dynamic deformation between the main inertial navigation system and the slave inertial navigation system; and step (4): substituting the error angle $\Delta\vec{\phi}$ deduced in step (3) into an expression $\Delta\vec{\omega}$ of a coupling error angular velocity; solving $\Delta\vec{\omega}_2$ of the expression $\Delta\vec{\omega}$ and compensating an error of an angular velocity matching in a process of a transfer alignment; and applying the coupling error angular velocity to an angular velocity matching process of the transfer alignment of the transfer alignment process, to improve a precision of the transfer alignment.

2. The method according to claim 1, wherein in step (2), the dynamic deformation is a dynamic elastic deformation and comprises bending and vibration, wherein the bending is a first movement with the low frequency and the high amplitude, and the vibration represents a second movement with the high frequency and the low amplitude; and in step (2), the angular velocity model under the dynamic deformation of the aircraft wing is established as follows: the angular velocity of the main inertial navigation system and the slave inertial navigation system is expressed as:

$$\vec{\omega} = \vec{\omega}_{stat} + \vec{\omega}_{dyn},$$

wherein $$\vec{\omega}_{dyn} = \vec{\omega}_{dyn}^{flex} + \vec{\omega}_{dyn}^{vib},$$

$\vec{\omega}$ represents a relative angular velocity vector between the main inertial navigation system and the slave inertial navigation system, $\vec{\omega}_{stat}$ represents a static relative angular velocity vector between the main inertial navigation system and the slave inertial navigation system, $\vec{\omega}_{dyn}$ represents a dynamic relative angular velocity vector between the main inertial navigation system and the slave inertial navigation system, $\vec{\omega}_{dyn}^{flex}$ represents a first angular velocity changed part generated by the bending deformation in the dynamic relative angular velocity vector between the main inertial navigation system and the slave inertial navigation system, and $\vec{\omega}_{dyn}^{vib}$ represents a second angular velocity changed part generated by the vibration deformation in the dynamic relative angular velocity vector between the main inertial navigation system and the slave inertial navigation system.

3. The method according to claim 2, wherein a specific method of the deducing the error angle $\Delta\vec{\phi}$ between the main inertial navigation system and the slave inertial navigation system in step (3) is: geometrically analyzing a coupling angle vector of the dynamic deformation, wherein in the dynamic relative angular velocity vector, the second angular velocity changed part $\vec{\omega}_{dyn}^{vib}$ generated by the vibration deformation is regarded as the noise, and let the first angular velocity changed part $\vec{\omega}_{dyn}^{flex}$ generated by the bending deformation, $$\vec{\omega}_{dyn}^{flex} = \vec{\omega}_\theta,$$

then:

$$\vec{\omega}_{is}^{s'} = C_m^{s'}(\varphi)\vec{\omega}_{im}^m$$
$$\vec{\varphi} = \vec{\phi}_0 + \vec{\theta},$$

wherein $\vec{\omega}_{is}^{s'}$ represents an output of a gyroscope of the slave inertial navigation system in an ideal state, $\vec{\omega}_{im}^m$ represents an output of a gyroscope of the main inertial navigation system, $C_m^{s'}(\vec{\varphi})$ represents a transformation matrix between the main inertial navigation system and the slave inertial navigation system, $\vec{\varphi}$ represents an error angle vector between the main inertial navigation system and the slave inertial navigation system, $\vec{\phi}_0$ represents an error angle vector of initial mounting between the main inertial navigation system and the slave inertial navigation system, and an additional angular velocity $\vec{\omega}_\theta$ is generated due to a dynamic bending deformation, and the angular velocity output $\vec{\omega}_{is}^s$ of the slave inertial navigation system in an actual state is expressed as:

$$\vec{\omega}_{is}^s = \vec{\omega}_{is}^{s'} + \vec{\omega}_\theta,$$

let the error angle vector between the main inertial navigation system and the slave inertial navigation system caused by the coupling angular velocity of the bending deformation $\Delta\vec{\phi}$, and let $$\Delta\vec{\phi} = [\Delta\phi_x, \Delta\phi_y, \Delta\phi_z]^T,$$

subscripts x, y, z respectively represent three directions: east, north, and up, $\Delta\vec{\phi}$ is the error angle vector between the main inertial navigation system and the slave inertial navigation system caused by the coupling angular velocity of the bending deformation, that is, an angle between $\vec{\omega}_{is}^s$ and $\vec{\omega}_{is}^{s'}$, let $\vec{\omega}_{is}^{s'} = [\omega_{isx}^{s'}, \omega_{isy}^{s'}, \omega_{isz}^{s'}]^T$, and $\vec{\omega}_\theta = [\omega_{\theta x}, \omega_{\theta y}, \omega_{\theta z}]^T$, then:

$$\vec{\omega}_{is}^s = [\omega_{isx}^{s'} + \omega_{\theta x}, \omega_{isy}^{s'} + \omega_{\theta y}, \omega_{isz}^{s'} + \omega_{\theta z}]^T,$$

according to a geometric relationship:

$$\begin{cases} \Delta\phi_x = \arctan\dfrac{\omega_{isz}^{s'} + \omega_{\theta z}}{\omega_{isy}^{s'} + \omega_{\theta y}} - \arctan\dfrac{\omega_{isz}^{s'}}{\omega_{isy}^{s'}} \\ \Delta\phi_y = \arctan\dfrac{\omega_{isx}^{s'} + \omega_{\theta x}}{\omega_{isz}^{s'} + \omega_{\theta z}} - \arctan\dfrac{\omega_{isx}^{s'}}{\omega_{isz}^{s'}}, \\ \Delta\phi_z = \arctan\dfrac{\omega_{isy}^{s'} + \omega_{\theta y}}{\omega_{isx}^{s'} + \omega_{\theta x}} - \arctan\dfrac{\omega_{isy}^{s'}}{\omega_{isx}^{s'}} \end{cases}$$

an arctan function is expanded by using Taylor series, and high-order terms are omitted, to obtain:

$$\begin{cases} \Delta\phi_x = \dfrac{\omega_{isz}^{s'} + \omega_{\theta z}}{\omega_{isy}^{s'} + \omega_{\theta y}} - \dfrac{\omega_{isz}^{s'}}{\omega_{isy}^{s'}} \\ \Delta\phi_y = \dfrac{\omega_{isx}^{s'} + \omega_{\theta x}}{\omega_{isz}^{s'} + \omega_{\theta z}} - \dfrac{\omega_{isx}^{s'}}{\omega_{isz}^{s'}}, \\ \Delta\phi_z = \dfrac{\omega_{isy}^{s'} + \omega_{\theta y}}{\omega_{isx}^{s'} + \omega_{\theta x}} - \dfrac{\omega_{isy}^{s'}}{\omega_{isx}^{s'}} \end{cases}$$

4. The method according to claim 3, wherein the error angle $\Delta\vec{\phi}$ deduced in step (3) is substituted into the expression $\Delta\vec{\omega}$ of the coupling error angular velocity in step (4) as follows: an angular velocity difference $\Delta\vec{\omega}$ between the main inertial navigation system and the slave inertial navigation system is expressed as:

$$\Delta\vec{\omega} = \vec{\omega}_{is}^s - \vec{\omega}_{im}^m$$
$$\Delta\vec{\omega} = \vec{\omega}_{is}^{s'} + \vec{\omega}_\theta - \vec{\omega}_{im}^m,$$

the error angle vector between the main inertial navigation system and the slave inertial navigation system is $\Delta\vec{\phi}$, then the transformation matrix between the main inertial navigation system and the slave inertial navigation system is expressed as $C_m^{s'}(\vec{\varphi} + \Delta\vec{\phi})$, and the coupling error angular velocity between the main inertial navigation system and the slave inertial navigation system is expressed as:

$$\Delta\vec{\omega} = C_m^{s'}(\vec{\varphi} + \Delta\vec{\phi})\vec{\omega}_{im}^m + \vec{\omega}'_\theta - \vec{\omega}_{im}^m,$$

wherein $\vec{\omega}'_\theta$ is a projection of $\vec{\omega}_\theta$ on $\vec{\omega}_{is}^s$, and because an equivalent rotation vector $(\vec{\varphi} + \Delta\vec{\phi})$ between inertial navigation system and the slave inertial navigation system is small, then $$[(\vec{\varphi} + \Delta\vec{\phi}) \times] = I - C_m^{s'}(\vec{\varphi} + \Delta\vec{\phi}),$$

wherein x represents an antisymmetric matrix, therefore:

$$\Delta\vec{\omega} = \vec{\omega}'_\theta - [(\vec{\varphi} + \Delta\vec{\phi}) \times]\vec{\omega}_{im}^m,$$

wherein $[(\vec{\varphi} + \Delta\vec{\phi}) \times]$ represents an antisymmetric matrix, and $\vec{\omega}'_\theta$ is expressed as:

$$\vec{\omega}'_\theta = A(\vec{\omega}_\theta)T(\vec{\alpha})\vec{u}_{is}^s,$$

wherein $A(\vec{\omega}_\theta)$ represents an amplitude matrix,
$\vec{u}_{is}^s$ represents an identity matrix in a direction $\vec{\omega}_{is}^s$,
$\vec{\alpha}$ represents an angle vector between $\vec{\omega}_\theta$ and $\vec{\omega}_{is}^s$,
$T(\vec{\alpha})$ represents a transformation matrix from $\vec{\omega}_\theta$ to $$\vec{\alpha} = \frac{\pi}{2}U - \Delta\vec{\phi},$$

wherein $U = [1\ 1\ 1]^T$, and:

$$A(\vec{\omega}_\theta) = \begin{bmatrix} |\omega_{\theta_x}| & 0 & 0 \\ 0 & |\omega_{\theta_y}| & 0 \\ 0 & 0 & |\omega_{\theta_z}| \end{bmatrix}$$

-continued $$\vec{u}_{is}^s = \frac{\vec{\omega}_{is}^s}{|\vec{\omega}_{is}^s|}$$

$$T(\vec{\alpha}) = I - \left[\left(\frac{\pi}{2}U - \Delta\vec{\phi}\right)\times\right],$$

a symbol $\|$ represents modulo operation and $\vec{\omega}'_\theta$ is substituted into the expression of $\Delta\vec{\omega}$, then:

$$\Delta\vec{\omega} = (\vec{\omega}_{im}^m \times)\vec{\varphi} + (\vec{\omega}_{im}^m \times)\Delta\vec{\phi} + A(\vec{\omega}_\theta)\vec{u}_{is}^s - A(\vec{\omega}_\theta)\left[\left(\frac{\pi}{2}U - \Delta\vec{\phi}\right)\times\right]\vec{u}_{is}^s,$$

\* \* \* \* \*